United States Patent

Fisher

[15] 3,661,226
[45] May 9, 1972

[54] SUSPENDED STAGING HOLD-IN APPARATUS

[72] Inventor: Sidney L. Fisher, Renton, Wash.
[73] Assignee: Spider Staging, Inc., Seattle, Wash.
[22] Filed: Dec. 10, 1970
[21] Appl. No.: 96,912

Related U.S. Application Data

[62] Division of Ser. No. 861,757, Sept. 29, 1969.

[52] U.S. Cl. ............................................................ 182/142
[51] Int. Cl. ............................................................. E04g 3/10
[58] Field of Search ..................................... 182/142, 150

[56] References Cited

UNITED STATES PATENTS

| 2,881,029 | 4/1959 | Tollefsen | 182/142 |
| 3,220,509 | 11/1965 | Fisher | 182/142 |
| 3,375,900 | 4/1968 | Conley | 182/142 |

*Primary Examiner*—Reinaldo P. Machado
*Attorney*—Graybeal, Cole & Barnard

[57] ABSTRACT

One or more tensioned hold-in lines hold the staging inwardly against the object on which welding work is being done. Each hold-in line rides on a sheave which is automatically controlled to move either towards or away from the object for the purpose of maintaining proper tension in the hold-in line.

6 Claims, 10 Drawing Figures

INVENTOR
SIDNEY L. FISHER
BY Greybeal, Cole &
Barnard
ATTORNEYS

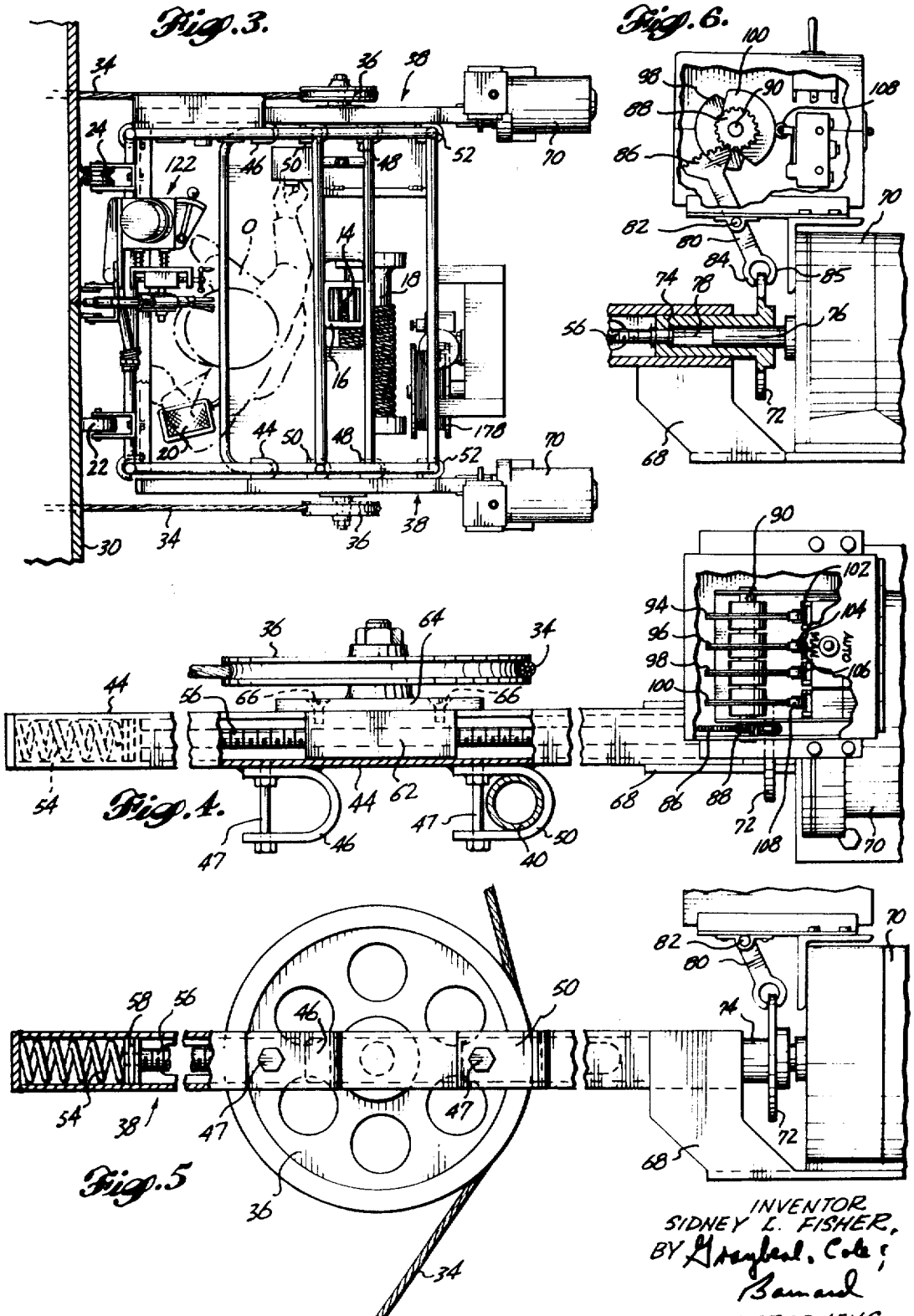

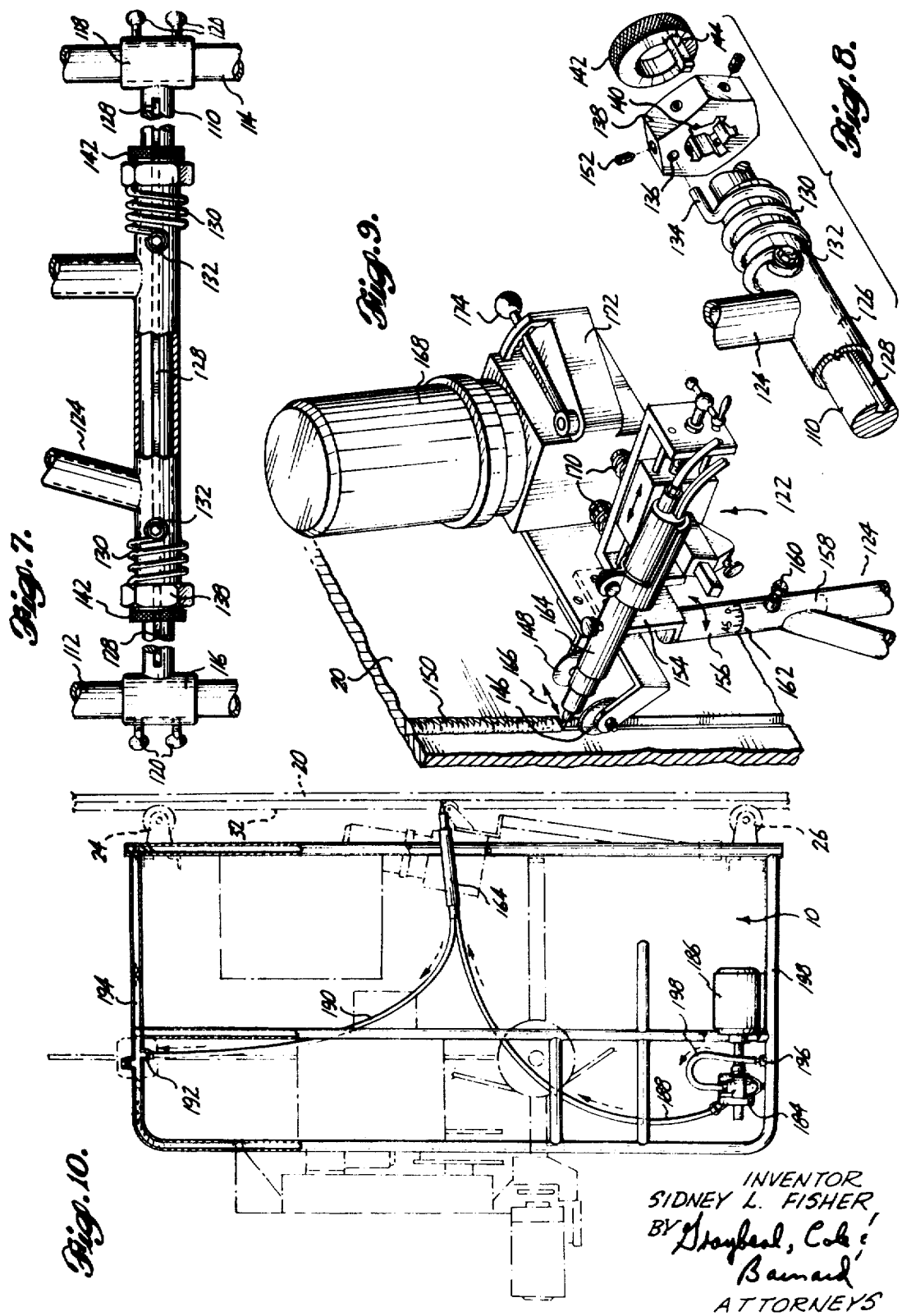

3,661,226

SUSPENDED STAGING HOLD-IN APPARATUS

CROSS-REFERENCE TO RELATED APPLICATIONS

This is a division of my copending application Ser. No. 861,757, filed Sept. 29, 1969, and entitled Suspended Staging Incorporating Automatic Welding Equipment.

BACKGROUND OF THE INVENTION

1. Field of the Invention

This invention relates to single cable suspended stagings, and more particularly to apparatus for holding such stagings against vertically curved work surfaces.

2. Description of the Prior Art

In ship building, large tank construction, etc., vertical walls or barriers are formed by welding together a plurality of large plate steel panels. Automatic welding machines are generally used for performing this work. They comprise a welding torch and means for moving the torch at the proper rate of travel along, and at the proper spacing from, the seam being welded.

Harmsen et al., U.S. Pat. No. 3,303,321 shows one type of known equipment for welding vertical seams. It is characterized by an elaborate track structure 14 which is secured to a part of the object on which welding is being done and in which the mechanism for moving the welding equipment is incorporated. A disadvantage of this type of equipment is that it does not lend itself to use with both straight and curved surfaces, and it does not involve an operator's station adjacent the welding equipment. Even in automatic welding operations it is necessary to have an operator present to make necessary adjustments and to inspect the work as it is being done.

Christensen et al., U.S. Pat. No. 2,794,901 disclose another type of automatic vertical seam welding machine involving a plurality of vertical post members along which the welding equipment travels up and down. A platform is provided on each side of the wall being formed and each platform includes a counterweight for biasing it inwardly toward the wall panels being welded. This type of equipment is quite expensive, is cumbersome to operate, is not suitable for use with vertically curved panels, and is not adaptable for use in welding relatively long vertical seams.

SUMMARY OF THE INVENTION

The present invention relates to a suspended staging, and in particular to a type of staging that is especially adapted to function as an automatic welding machine for use in welding vertical seams.

In my prior U.S. Pat. No. 3,220,509, granted Nov. 30, 1965, I disclose a suspended staging which is adaptable for use in welding vertical seams. Some of the features of the present invention may be incorporated in the staging disclosed in my U.S. Pat. No. 3,220,509. Other features of the present invention involve improvements in such staging equipment.

During its vertical travel the staging of this invention is maintained in against the work object by means of one or more hold-in cables, similar to the type shown by my aforementioned U.S. Pat. No. 3,220,509. According to the present invention, each cable is provided with a motorized means for automatically maintaining the proper tension or hold-in force in each hold-in cable. The invention also relates to various specific features of the motorized means.

BRIEF DESCRIPTION OF THE DRAWING

FIG. 3 is a top plan view of the welding machine, also including a phantom line showing of the operator;

FIG. 4 is a top plan view of one of the hold-in cable tensioning mechanisms, with some outer parts broken away for clarity of illustration of certain inner parts, with a constant section intermediate portion of the mechanism being segmented, and with certain end portions of the mechanism not essential to the showing being omitted;

FIG. 5 is a side elevational view of the mechanism of FIG. 4, which in similar fashion is also segmented and broken away in parts;

FIG. 6 is a fragmentary side elevational view of the control cam end of the hold-in mechanism;

FIG. 7 is a fragmentary view of the base portion of the welding tool support standard;

FIG. 8 is an exploded fragmentary isometric view of one of the adjustable biasing spring assemblies;

FIG. 9 is a fragmentary view of a typical welding head assembly, shown in the process of being used for welding a vertical seam; and FIG. 10 is a side elevational view of the machine taken from the side opposite the side shown by FIG. 2, showing the various components of the cooling system for the welding head, including the radiator composed of tubular frame portions of the machine, with certain components not essential to this feature of the invention being omitted and others being depicted by broken lines for purposes of reference.

DESCRIPTION OF THE PREFERRED EMBODIMENTS

Figure 2:
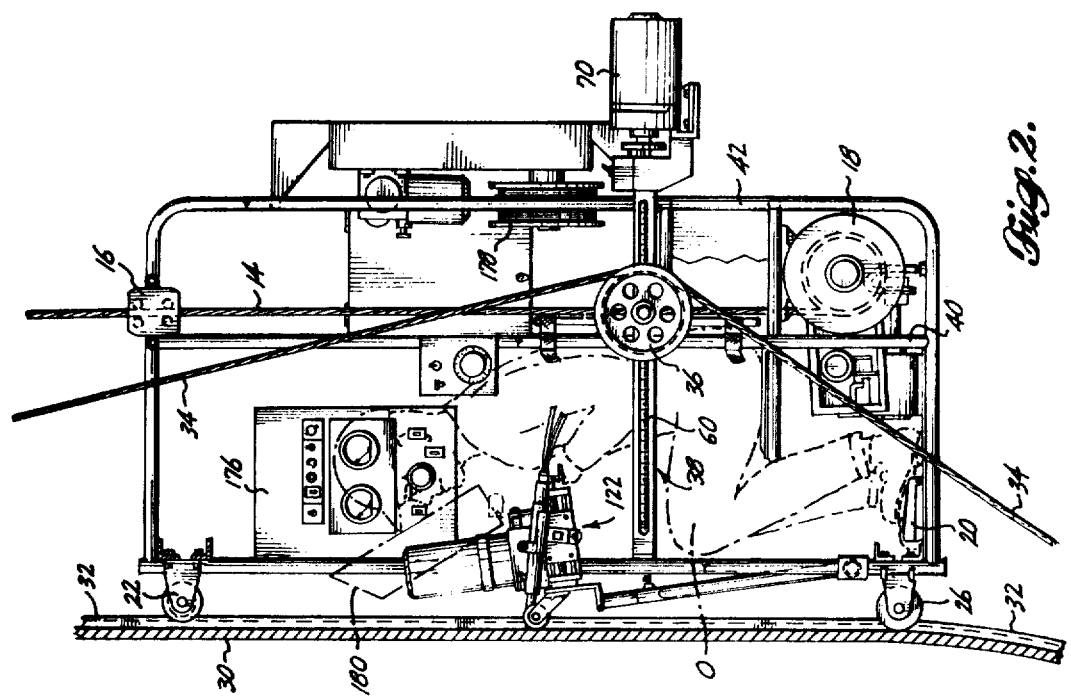
FIG. 2 is a side elevational view of the welding machine, including a phantom line showing of an operator and his face protection shield.

Referring more specifically to the several figures of the drawing, the suspended staging is shown to comprise a forwardly disposed operator compartment or cage 10 having a floor or deck 12. A suspension line 14 extends from an anchored position above (not shown) downwardly through a fairlead 16 to a power-driven winch drum 18 onto and off from which line 14 is wound. In a single suspension cable staging of the type shown safety and reliability of operation are extremely important. In this respect it is vital that the suspension line 14 spool onto the winch drum 18 compactly and levelly, that the take-up and let-out of the suspension line 14 progress evenly, and that no undue wear of the suspension line 14 occurs. So that these conditions will exist, the winch mechanism is preferably of the level-winding type disclosed and claimed in my prior U.S. Pat. No. 2,998,094. The contents of such U.S. Pat. No. 2,998,094 and the contents of my aforementioned U.S. Pat. No. 3,303,321 are hereby incorporated herein by this specific reference.

The winch drum 18 is preferably driven by a variable speed, reversible electric motor mounted in the lower portion of compartment 14 closely adjacent the winch drum 18 and suitably connected thereto by gear reduction means. The control circuit for the electric drive motor includes a suitable switch mechanism operable to control the direction of rotation of the reversible motor. Preferably, a rheostat is provided in series between the switch mechanism and the motor and is used for varying the rotational speed of the motor and the winch drum so as to in turn vary the rate of up or down travel of the staging. The rheostat may be adjusted so as to coordinate the rate of upward movement of the staging with the speed at which the welding operation can be preformed.

In the illustrated embodiment a foot operated off-on switch 20 is provided for controlling the electric motor and hence the starting and the stopping of vertical travel. Reference is made to the aforementioned U.S. Pat. Nos. 2,998,094 and 3,303,321 for a more detailed discussion of the staging drive and level-winding equipment and its manner of operation.

Upper and lower pairs of wheels 22, 24 and 26, 28 are supported at the front of the machine. Wheels 22, 26 are shown to directly contact the vertical wall 30 being traversed by the welding machine. Wheels 24, 28 have grooved peripheries and they follow along a vertical guide track 32 which is suitably secured to the wall 30. The welding machine must be accurately guided during its vertical travel while welding and the grooved wheels 24, 28 and the track 32 serve as simple and effective apparatus for forming the guiding or tracking function.

The track, shown to be made from standard angle iron, can be bent and made to follow a vertically curved surface in installations requiring welding along a vertically curved path. Of course, it is to be understood that the welding machine can be guided for travel along a straight line path by various other types of apparatus as well and that the particular guiding apparatus disclosed is presented merely by way of example.

It is also important for the welding machine to be maintained close against the vertical wall 30. For this purpose a pair of hold-in cables 34, 36 are provided, one laterally outwardly on each side of the staging. The cables 34, 36 are suitably anchored at their upper and lower ends and they each ride rearwardly of a freely rotatable sheave 38 and ride in a peripheral groove thereof. The sheaves 38 are supported by mechanism which is adapted to automatically shift the sheaves 38 in position normal to the wall 30, for the purpose of maintaining ample tension in the hold-in lines 34, 36.

As best shown by FIGS. 3–5, each sheave assembly 38 is individually securable to a frame portion of the staging on its side of the staging. The particular staging illustrated comprises a pair of rearwardly stationed vertical frame posts 40, 42 on each side of the staging. Each sheave positioning mechanism 38 includes an elongated lead screw housing 40 and two separately usable pairs of mounting brackets 42, 44 and 46, 48. The mounting brackets are shown in the form of U-shaped pieces of metal having one leg thereof welded to the back wall of the lead screw housing 40. The spacing of the clamps 42, 44, 46, 48 along the lead screw housing is such that the inner bight areas of each pair of brackets 42, 44 and 46, 48 are spaced apart a distance equal to the spacing of the vertical frame posts 40, 42. Machine bolts 53 may be used to clamp the brackets 46, 50 to the posts 40, 42.

Figure 1:
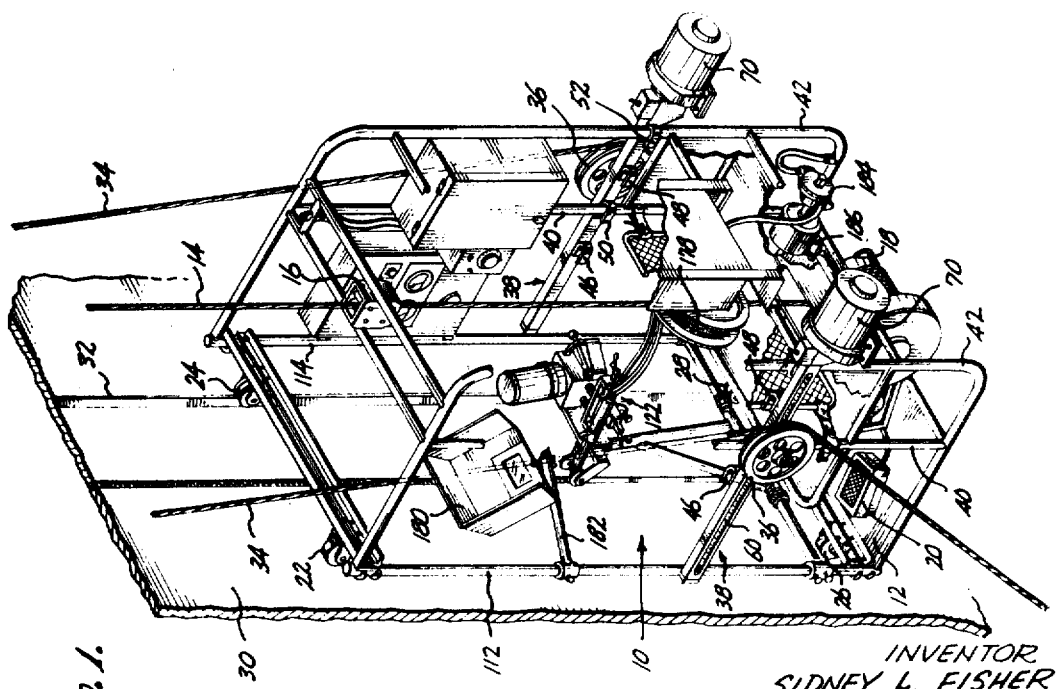
FIG. 1 is an isometric view taken from above and towards the rear and one side of a suspended staging type vertical seam welding machine constructed in accordance with the present invention, with foreground portions of the machine being cut away for the purpose of exposing other portions of the machine in the background of the view.

Referring now to FIGS. 4 and 5, a compression spring 54 is located in the housing 44 near the end thereof closest to the wall 30. A lead screw 56 is located inside of housing 38 and it includes a head 58 which rests against the compression spring 54. As best shown by FIGS. 1 and 2 the outer side of the lead screw housing 44 includes a longitudinal slot 60. An elongated sheave support block 62 is located within the housing 44. It includes a longitudinal bore threaded with internal threads which match the external threads of the lead screw 56. Block 62 is transversely dimensioned to be slightly smaller in size than the transverse dimensions of the hollow interior of the lead screw housing 44. A plate 64 located outwardly of housing 44 is secured to the block 62, such as by countersunk metal screws 66 or the like, and the sheave 36 is rotatably mounted on the plate 64. As can be readily seen, rotation of the lead screw 56 causes movement of the block 62 in one direction or the other longitudinally along the lead screw 56, resulting in a longitudinal travel of the sheave 36 relative to the lead screw housing 44.

A motor mounting bracket 68 is connected to, and depends downwardly below and then endwise outwardly from, the end portion of lead screw housing 44 distal the wall 30. It mounts an electric motor 70 which serves to rotate the lead screw 56. The end of the lead screw 56 distal the spring 54 is connected to a circular plate 72 in such a fashion that the plate both rotates and moves axially with the lead screw 56. As shown by FIG. 6, the lead screw 56 is secured to the inner end of a tubular hub 74 on which the plate 72 is mounted. The output shaft 76 of the motor 70 is noncircular in cross section and it is snugly received within a blind socket 76 formed axially through hub 74 and having the same cross-sectional shape as shaft 76. The noncircular cross-sectional shapes of the shaft 76 in the socket 68 establish a rotary drive connection between the shaft 76 and the hub 74. The fit of shaft 76 within socket 78 is loose enough so that the hub 74 is free to slide longitudinally of the shaft 76.

The motor 70 is a reversible motor and it is provided with both manual and automatic control means. The manual control means is primarily used when it is desirable to slacken the hold-in lines 34 for the purpose of dismantling the equipment, or to initially tension the lines 34.

The automatic control mechanism includes a control arm 80 which is pivotally mounted at a point intermediate its ends for swinging movement in a plane perpendicular to the plane of the plate 72, such as by a pivot pin 82. As shown by FIG. 6, the lower end of arm 80 is bifurcated and places an arcuate finger 84, 85 on each side of the plate 72. The fingers 84, 85 are inwardly concave to provide clearance for the peripheral portion of the plate 72 during each stage of relative movement. The opposite or upper end 86 of arm 80 carries an arcuate segment 86 of a gear which meshes with a drive gear 88 at one end of an elongated cam shaft 90 which turns on an axis parallel to the axis of pivot pin 82. A plurality of switch operating cams 94, 96, 98, 100 are spaced apart along the shaft 90. Each cam 94, 96, 98, 100 includes a mounting hub portion and a plate portion which is a sector of a circular plate. Set screws extending through the hubs are provided for securing the cams 94, 96, 98, 100 in set positions relative to the shaft 90. The plate portions of the cams 94, 96, 98, 100 are positioned to each contact and close a related switch lever 102, 104, 106, 108 during a particular rotational phase of the cam shaft 90.

The spring 54 is a calibrated spring and stores a predetermined amount of energy, i.e. 600 pounds. Let it be assumed that the various components are in the position depicted by FIG. 5, the tensioning mechanism is on automatic, and there is insufficient tension in a hold-in cable 34. Under such conditions the stored energy in spring 54 would push the lead screw 56 to the right, as pictured. The lead screw 56 would carry with it the cam positioning plate 72. Through arm 80, segment gear 86, gear 88 and shaft 90 the plate 72 would position one of the cams (e.g. cam 100) into contact with the switch lever 108 of the related switch, closing such switch and causing rotation of the motor 64 in the direction causing lead screw 56 to rotate in the direction to block 72 and the sheave 36 carried thereby to be moved rearwardly from the wall 30 and against the hold-in line 34, bending it outwardly and increasing its tension. Once the tension in line 34 reaches a desired amount further outward travel of the sheave 36 is arrested and the lead screw 56 begins to move longitudinally inwardly towards wall 30, compressing spring 54. Lead screw 56 carries plate 72 with it as it so moves. This plate movement causes a clockwise rotation of arm 80 and a counterclockwise rotation of the gear 88, the shaft 90 and the cam members 94, 96, 98, 100 carried thereby. Once the cable 34 is sufficiently tensioned one of the other cams (e.g. 98) operates its switch lever 106 to open the motor control circuit. Switches 102 and 104 are in the manual circuit and are limit switches to control the maximum allowable inward and outward movement of the sheave 36 during manual operation.

The tension control mechanisms for the two hold-in lines 34 operate independently of each other. This is important since an irregular wall shape or some other factor might cause a different set of conditions effecting hold-in line tension on one side of the staging from those existing on the other side of the staging.

Referring now to FIGS. 1, 7 and 9, a horizontal support bar 110 extends between and at its ends is connected to lower portions of the front frame posts 112, 114. In FIG. 7 bar 110 is shown to be connected to mounting sleeves 116, 118 at its opposite ends. Sleeve 116 surrounds post 112 and sleeve 118 surrounds post 114. One or more set screws 120 are provided through wall portions of the sleeves 116, 118, and hence the support bar 110, in position relative to the post 112, 114.

The welding mechanism, hereinafter to be described in greater detail, includes a welding torch assembly 122 mounted at the upper end of a support standard 124. Standard 124 includes a mounting sleeve 126 at its lower end which surroundingly engages the horizontal support bar 110, so as to be rotatable thereabout. The support bar 110 is formed to include a longitudinal key slot 128. A coil type torsion spring 130 is provided at each end of sleeve 126. The torsion springs 130 each surround an end portion of sleeve 126 and each has its inner end secured to the sleeve 126, such as by a securement pin 132. The outer ends of the springs 130 extend axially of the support bar 110 and are insertable into an opening 136 formed axially through an adjustment nut 138 which surrounds the support bar 110 outwardly of its end of sleeve 126. The inner wall of each nut 138 is formed to include a plurality of key slots 140 which are positionable radially outwardly of the key slot 126 in bar 110. A key element carrying ring 142 is located on bar 110 outwardly of each adjustment nut 138. Each ring 142 carries an axially extending key element 144 which is snugly receivable in the key slots 128, 140. The depth or radial dimension of the key element 144 is of a depth substantially equal to the combined depths of the slot 128 and a related slot 140.

The welding torch assembly includes a pair of laterally spaced apart guide wheels 146, 148, located on opposite sides of the weld line 150. It is important that throughout the welding operation these wheels 146, 150 remain in contact with the wall 20. The torsion springs 130 serve to resiliently bias the support standard 124 towards the wall 20, and in that manner maintain the contact of the wheels 146, 148 with wall 20.

Tensioning of the springs 130 involves the following procedure. The outer end portion 134 of each spring 130 is placed within the hole 136 for it in the related adjustment nut 138. Next the operator uses a wrench to rotate the nut 138 in the direction placing energy in the spring 130 for biasing the standard 124 toward wall 20. During the turning operation of each nut 138 the related cam ring 142 is slid endwise outwardly along support bar 110 to place its cam element 144 out of the way of nut rotational movement. Once sufficient energy is in a spring 130 the operator moves the nut 138 by means of the wrench into a position placing the nearest slot 140 in alignment with the slot 128. Then the ring 142 is moved endwise along shaft 110 to place key element 144 into engagement with the selected slot 140 in the nut 138 as well as with the slot 128 in bar 110. Preferably a set screw 152 is provided in nut 138 in association with each key slot 140. The set screws 152 are provided as a means for locking the key element 144 in position relative to the nut 138.

The welding torch assembly 122 is merely one of several commercially available pieces of automatic welding equipment which can be adapted for use in the welding machine of the present invention. Such assembly is shown to include a frame 154 which is mounted atop a support shaft 156. The lower end of the support shaft 156 extends downwardly into the upper end portion of the main tubular member 158 of standard 124. A set screw 160 extends through a side wall portion of tube 158 and is used to secure the shaft 156 and the frame carried thereby in a predetermined position relative to the standard 124. Angular gauge marks 162 may be provided on the external surfaces of post 156 in tube 158 where they meet.

The welding tool 164 is supported by adjustable mounting mechanism which provides for attitude adjustment of the tool 164 in essentially all directions. This equipment will not be described here because of its conventional nature. The mounting mechanism for the tool 160 also includes an adjustable power driven mechanism for moving or sweeping the welding torch tip sideways back-and-forth along the direction of arrow 166. This apparatus is shown to include a motor 168, reciprocating drive rods 178 for moving the welding tool 164, and an adjustable transmission 172 including a control lever 174 for changing the width of the tip stroke.

The welding equipment is shown to also include a control panel 176 located to one side of the operator O, within his easy reach, and a spool of welding rod wire 178 positioned rearwardly of the operator O. Also, a protective face mask 180 is mounted on front vertical post 112 by means of an adjustable support arm 182. Arm 182 is adjustable up and down and angularly around post 112 and the mask 180 is adjustably connected to the outer end of arm 182 by means of a universal joint.

The welding torch 164 is cooled by a refrigerant (e.g. water) which is delivered in a relatively cold condition into coolant passages within the torch 164. It is circulated about or adjacent the parts to be cooled. It is then removed from the torch 164 in a hot condition and is delivered to a radiator or some other device for removing the heat from it.

In FIG. 10 the cooling system is shown to comprise a pump 184 driven by an electric motor 186. Both the pump 184 and the motor 186 are mounted on the floor of the staging, generally rearwardly of the operator station 10. The discharge end of the pump 184 is connected to the cooling fluid inlet of the tool 164 by means of a hose 188. A second hose 190 delivers the heated coolant from the tool 164 into a radiator composed of at least some of the tubular frame members of the caging. By way of typical and therefore nonlimitive example, in the illustrated embodiment the hose 190 is shown connected to an inlet 192 provided in an upper horizontal tubular frame member 194. In this embodiment all of the tubular frame members are interiorly interconnected so that the entire staging serves as a radiator. An outlet 196 is provided in the lower horizontal member 198, and a hose 198 extends from the outlet 196 to the inlet of the pump 184. In operation, the coolant is pumped to and then through the welding tool 164. The heated coolant then travels through holes 190 into the radiator, i.e. into the interiors of the several tubular member 40, 42, 112, 114, 194, 196, etc. of the staging, and then from the radiator back into the pump 184. As will be apparent, the coolant is cooled by ambient air while it flows through the passageways of the radiator. Collectively the frame members expose a substantial surface area to the ambient air, resulting in the frame serving as an effective radiator. If additional cooling of the coolant is necessary, an additional heat exchanger or other cooler can be incorporated into the coolant circuit.

What is claimed is:

1. A suspended staging and adapted for up-and-down travel along a generally vertical object, said staging comprising deck and frame means forming a caged work station;
   bearing means on said staging;
   a tensioned hold-in line contacting a rear portion of said bearing means and sloping towards said object both above and below said bearing means and exerting a hold-in force on said bearing means;
   means mounting said bearing means onto said frame for selective movement towards and away from said object;
   reversible drive means including a motor connected to said bearing means for moving it towards and away from said object; and
   control means for said drive means responsive to the hold-in force imposed on said bearing means by said hold-in line for causing said drive means to automatically move said bearing means outwardly from said object whenever said force falls below a predetermined desirable value, and to automatically move said bearing means inwardly towards said object whenever said force exceeds a predetermined value.

2. A staging according to claim 1, wherein said bearing means is a wheel having a grooved periphery for receiving said hold-in line.

3. A staging according to claim 1, comprising a pair of said hold-in lines, laterally spaced apart across the staging, and a said bearing means, a said mounting means, a said drive means, and a said control means associated with each said hold-in line.

4. A staging according to claim 3, wherein each said control means functions independently of the other by responding only to the hold-in force exerted by its cable.

5. A suspended staging adapted for up-and-down travel along a generally vertical work area, said staging comprising deck and frame means forming a caged work station;
   a lead screw supported on said staging and extending generally normal to said generally vertical object;
   bearing means;

carriage means mounting said bearing means on said lead screw for rectilinear travel therealong in response to rotation of the lead screw;

a hold-in line contacting a rear portion of said bearing means and sloping toward said generally vertical object both above and below said bearing means, and exerting a holding force on said bearing means; and reversible motor means for selectively rotating the lead screw in either direction.

6. A suspended staging according to claim 5, further comprising means supporting said lead screw for axial movement, spring means biasing said lead screw axially towards and in opposition to the force of said hold-in line; and control means responsive to the position to said lead screw for energizing said motor means and cause it to rotate the lead screw in a direction causing movement of the bearing means outwardly whenever the lead screw is forced outwardly more than a predetermined amount by said spring means, and rotating said screw in the opposite direction whenever said lead screw is moved axially inwardly beyond a predetermined amount.

* * * * *